March 15, 1938.  R. D. MacDONALD  2,111,189
FEEDER FOR FEED CHOPPERS
Filed March 15, 1937
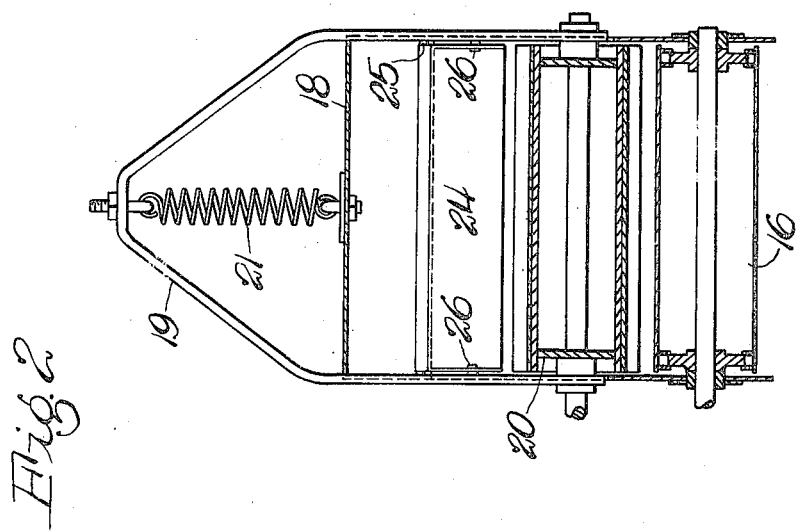
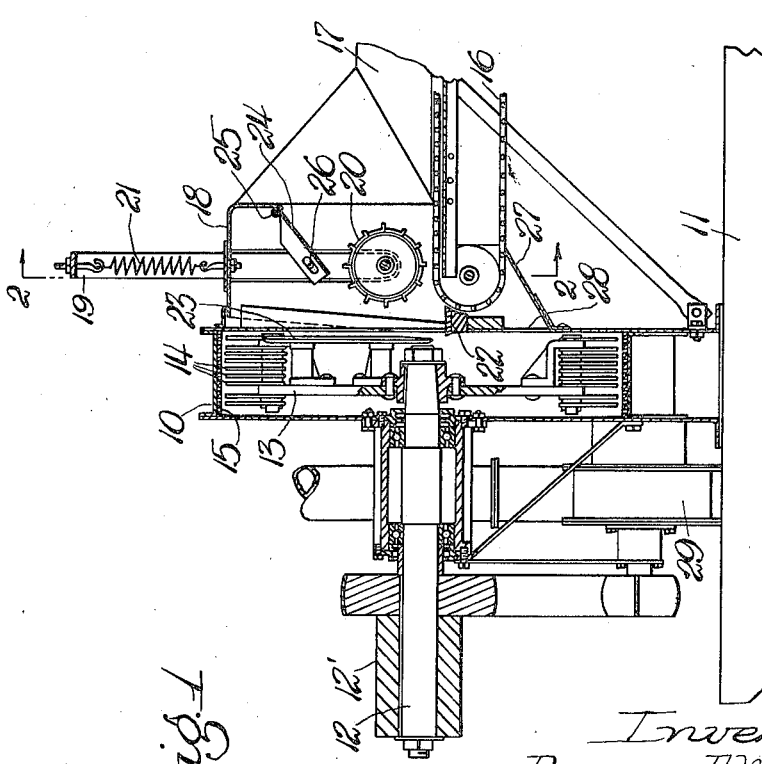
Inventor
Raymore D. MacDonald
By V. F. Lassagne
Atty.

Patented Mar. 15, 1938

2,111,189

UNITED STATES PATENT OFFICE 2,111,189

FEEDER FOR FEED CHOPPERS

Raymore D. MacDonald, Western Springs, Ill., assignor to International Harvester Company, a corporation of New Jersey Application March 15, 1937, Serial No. 130,935

3 Claims. (Cl. 146—109)

This invention relates to a feed mechanism for feed choppers of the type including hammer mills, ensilage cutters or the like. More particularly, the invention relates to means cooperating with the feeding mechanism for retarding or preventing loose material from escaping the feeding mechanism.

In feed chopping machines of the type above referred to, it is common practice to provide a drum forming a feed reducing chamber having feed reducing means therein and a feeding mechanism for feeding material thereto. The feeding mechanism is usually of the type comprising a housing associated with the feed reducing chamber, a conveyor mounted therebelow, a frame carried by the housing and a feed roll journaled in the frame above the conveyor and cooperating therewith for feeding material to the feed reducing chamber. The frame is usually slidably carried by the housing and resiliently urged downwardly toward the conveyor for the purpose of allowing the feed roll to maintain a position in close proximity thereto. Material entering between the conveyor and the feed roll will tend to raise the feed roll upwardly against the resilient means, which results in pressure being applied to the feed roll. It has been a problem, in these machines, to prevent material from escaping the conveyor over the top of the feed roll.

It is the principal object of this invention, therefore, to provide means for retarding or preventing the escape of the material from the feeding mechanism.

Another object of the invention is to mount the retarding means in such a manner as will allow movement thereof with the slidable frame carrying the feed roll.

These and other important objects are achieved by providing in a machine of the class described, a retarding means comprising a gate pivotally carried by the housing and slidably carried by the frame.

A further understanding of the objects and features of the invention may be had from the following description of a preferred embodiment of the invention, as shown in the accompanying sheet of drawings, in which:

Figure 1 is a longitudinal sectional view of a feed chopper of the hammer mill type showing the new and improved retarding means and its mounting in relation to the housing and the frame; and, Figure 2 is an enlarged transverse sectional view taken on the line 2—2 of Figure 1.

It will be understood that while the drawing and description disclose a feed chopper of the hammer mill type, the invention may be utilized in conjunction with any other machine of the feed chopping type, such as ensilage cutters or the like. With this in mind, a hammer mill comprising a drum 10 carried on a base 11 is shown. Mounted on a horizontal shaft 12 is a rotor 13 carrying hammers 14 cooperating with a screen 15 carried by the drum 10 for reducing feed within the drum. The shaft 12 carries thereon for rotation therewith a drive pulley 12' which may be driven by a belt from any source of power, as is well known to those skilled in the art.

The above construction is more or less conventional and the rotor hammers and screen provide with the drum 10 a feed reducing chamber. Positioned rearwardly of the drum 10 is a feed conveyor 16 comprising a pair of spaced chains and transverse slats carried on sprockets mounted on a transverse shaft carried by suitable frame work attached to the drum. The feed conveyor is provided at each side thereof with a conventional type of apron 17. A housing 18, associated with the drum 10 and the apron 17, forms a hood over the forward end of the conveyor 16. Slidably carried by the housing or hood 18 is a frame 19, as best shown in Figure 2, in which is journaled a feed roll 20. The frame is resiliently urged downwardly by a tension spring 21. As best shown in Figure 1, the feed roll is adapted to operate above the forward end of the conveyor 16. Material carried by the conveyor 16 toward the feed reducing chamber passes below the feed roll 20 and over a cutter bar or knife bar 22.

A knife 23 is carried by the rotor 13 within the feed reducing chamber and cooperates with the cutter bar 22 to aid in reducing material. The feed roll and conveyor are driven in any suitable manner from the drive shaft 12, as will be well understood by those skilled in the art.

It was found in feeding hammer mills, ensilage cutters or the like, that surplus material dropped on the conveyor 16 would sometimes escape the feed roll 20 and enter the feed reducing chamber over the top of the feed roll. This occurrence is especially true when a large amount of corn stalks is piled on the conveyor, as the corn stalks can more easily ride over the top of the feed roll. This problem was met and solved by equipping the hammer mill with a retarding element or gate 24, as best shown in Figure 1. The gate is pivotally carried by the housing 18 on a transverse rod 25 and extends forwardly and downwardly to a point substantially above the axis of the feed roll 20 and parallel thereto, where it is slidably carried by the frame 19.

The gate 24 is provided at opposite ends with up-turned portions formed with slots therein. Pins 26 carried by the frame 19 at opposite sides thereof, as best shown in Figure 2, cooperate with the slots in the gate 24 to provide means for slidably mounting the gate with respect to the frame and for movement therewith.

Positioned below the forward end of the conveyor 16 is an inclined pan 27 leading to an opening 28 provided in the drum 10. Small particles of material escaping downwardly through the conveyor 16 drop on the pan 27 and are sucked into the feed reducing chamber by suction created by the rotor 13. Also, as best shown in Figure 1, the rearward portion of the cutter bar 22 is positioned in close proximity to the forward end of the conveyor 16 and substantially tangential to the periphery of the conveyor about the sprockets on which it is carried. This mounting of the cutter bar 22, with respect to the conveyor 16, provides a means for scraping material from the transverse slats of the conveyor. A blower mechanism 29 driven by the shaft 12, in any suitable manner, is provided to remove reduced feed from the feed reducing chamber. The blower mechanism is of more or less conventional construction.

In the operation of the machine, material is piled on the conveyor 16 to be carried forwardly to the feed reducing chamber in the drum 10. It is essential that the material passes between the feed roll 20 and the conveyor 16. The resilient mounting of the frame 19 will provide upward movement of the feed roll 20 to accommodate a certain amount of excess material. Other excess material, such as corn stalks, as previously mentioned, that may have a tendency to escape the feed roll 20, and to pass thereabove, will be deflected backwardly and downwardly by the retarding element or gate 24. Because of the pivotal mounting of the gate 24 in the housing 18 and the slidable connection with the frame 19, the gate is permitted to move upwardly with the frame 19 maintaining at all times its position with respect to the feed roll 20. By this means, it has been found that provision is made for preventing excess material from escaping the feeding mechanism.

It will be understoood that while a preferred embodiment of the invention has been shown in a hammer mill for the sake of disclosure, numerous modifications and alterations may be made without departing from the spirit and scope of the invention, as indicated in the following claims. It is the intention to cover all such modifications and alterations.

What is claimed is:

1. In a machine of the class described having a drum providing a feed reducing chamber, a feed conveyor for supplying material to said chamber, a housing associated with the drum and positioned above the conveyor, a frame slidably carried by said housing for vertical movement with respect thereto, a feed roll journaled in the frame, the combination with the frame, of a gate member pivotally mounted in the housing above the feed roll, and slidably attached to the frame above the feed roll for movement therewith.

2. In a machine of the class described having a drum providing a feed reducing chamber, a feed conveyor for supplying material to said chamber, a housing associated with the drum and positioned above the conveyor, a frame slidably carried by said housing for vertical movement with respect thereto, a feed roll journaled in the frame, the combination with the frame, of a gate member pivotally carried in the housing above the feed roll and substantially parallel thereto, said gate having opposite ends upturned adjacent opposite sides of the frame, said up-turned ends being formed with slots therein, and means carried by the frame and cooperating with the slots for slidably attaching the gate to the frame for movement therewith.

3. In a machine of the class described having a drum providing a feed reducing chamber, a feed conveyor for supplying material to said chamber, a housing associated with the drum and positioned above the conveyor, a frame slidably carried by said housing for vertical movement with respect thereto, a feed roll journaled in the frame, the combination with the frame, of a gate pivoted in the housing at a point rearward of the feed roll, said gate extending forwardly to a point substantiallly above the axis of the feed roll and being slidably carried by the frame for movement therewith.

RAYMORE D. MacDONALD.